United States Patent Office 3,003,964
Patented Oct. 10, 1961

3,003,964
RADIOCHEMICAL PRODUCTION OF PHOSPHO-SULFURIZED HYDROCARBONS
Donald A. Guthrie and Carroll L. Knapp, Jr., Cranford, N.J., assignors to Esso Research and Engineering Company, a corporation of Delaware
No Drawing. Filed Mar. 1, 1954, Ser. No. 413,478
16 Claims. (Cl. 252—46.6)

The present invention relates to an improved process of producing phosphosulfurized hydrocarbons, to improved products obtained by this process and to compositions containing these products. More particularly, the invention is concerned with the production of phosphorus- and sulfur-containing hydrocarbons or hydrocarbon radical-containing compounds having utility as detergents, oxidation and corrosion inhibitors, extreme pressure agents and similar additives for fuels, lubricating oils and greases by reacting a hydrocarbon or hydrocarbon radical with a phosphosulfurizing agent at conditions conducive to introduce phosphorus and sulfur into the hydrocarbon molecule.

In brief compass, the invention pertains to the production of improved phosphosulfurized hydrocarbon materials of the type specified by reacting such hydrocarbon materials with a phosphosulfurizing agent while exposing the reactants to radiation emitted by sources of high energy radioactivity. In accordance with the preferred embodiment of the invention, the reaction is carried out in the presence of a solvent for the reactants.

Phosphosulfurized hydrocarbons and various derivatives thereof have been used heretofore as lubricating oil additives chiefly to improve the detergency and corrosion characteristics of the oils. Relatively high sulfur and phosphorus contents are required to obtain additives of sufficiently strong activity for the purpose desired. Severe reaction conditions involving reaction temperatures of 200°–500° F., usually in the neighborhood of about 400° F. are needed to form such products. On the other hand, the higher the phosphorus and particularly the sulfur content of these known materials, the lower is normally their color and odor stability and the higher their corrosiveness toward such metals as copper or silver.

Therefore, it has been necessary heretofore to subject phosphosulfurized additives to special treatments eliminating these undesirable characteristics. Neutralization with various basic reagents or further reaction with unsaturated compounds, such as terpenes, are examples of such treatments, all of which involve additional expense without providing a complete solution of the problem involved. The present invention provides a process by which phosphosulfurized hydrocarbon materials of adequately high phosphorus and sulfur contents and good stability may be produced in a simplified process at extremely mild reaction conditions.

In accordance with the present invention, phosphosulfurized hydrocarbon materials of the type referred to above are prepared by subjecting a hydrocarbonaceous material and a phosphosulfurizing agent in intimate contact with each other to high energy radioactive radiation for a time sufficient to effect the desired degree of phosphosulfurization. Types of radiation suitable for the purposes of the invention include high energy electro-magnetic radiation, such as gamma rays and X-rays and high velocity electrons, such as beta rays, as well as alpha particles.

These types of radiation may be supplied by naturally occurring radioactive materials, such as radium and its compounds, which emit alpha, beta and gamma rays. Fission by-products of processes generating atomic power and/or fissionable materials, which emit high energy gamma rays, afford a highly desirable and most abundant source of radioactivity suitable for the purposes of the invention. These by-products include elements with atomic numbers ranging from 30 (zinc) to 63 (europium) and their compounds. They are formed in the course of converting uranium, thorium and other fissionable materials in an atomic reactor.

Materials made radioactive by exposure of the parent element to neutron radiation, such as radioactive cobalt ($Co^{60}$), europium 152 or europium 154 which emit gamma rays, may likewise be used. Suitable sources of high velocity electrons are the beams of electron accelerators, such as the Van de Graaf generator or the Betatron. In general, however, high intensity gamma radiation and its well-known sources, such as nuclear fission by-products and materials made radioactive by neutron radiation are preferred for the purposes of the invention mainly because of the relatively high penetrating power of the gamma rays and the availability and ease of application of these sources of gamma radiation.

It has been found that phosphosulfurization reactions of the type here involved may be carried out to form valuable detergents, corrosion-inhibitors and extreme pressure agents by exposure of the reactants to radiation of the type specified above quite generally at temperatures substantially below 200° F. and usually at room temperatures of, say, about 60°–80° F. Radiation time and intensity largely depend on the reactivity of the hydrocarbon used and the phosphorus and sulfur content desired for the end product. Broad operable ranges cover a few seconds to several hours, say about 0.5–48 hours radiation time and about 10,000–20,000,000 Roentgen per hour (R./hr.) radiation intensity. Conversion is the higher the longer the radiation time and the higher the radiation intensity, resulting in higher sulfur and phosphorus content of the reaction product. Independent of the conversion level, the products of the invention are superior to those prepared by conventional thermal methods, particularly with regard to color and corrosiveness toward such metals as copper and silver which are commonly used as components in bearing metal alloys.

Phosphorus and sulfur contents of the products of the invention may fall within the ranges of 0.2–10 wt. percent and 0.2–15 wt. percent, respectively. Phosphorus contents of about 0.2–5 wt. percent and sulfur contents of about 0.2–8 wt. percent based on final product may be readily obtained. Conditions particularly suitable for the production of such materials include temperatures of about 60°–80° F., radiation times of about 10–30 hours, radiation intensities of about 200,000–300,000 R./hr., and phosphorus sulfide proportions of about 5–25 wt. percent, preferably about 8–15 wt. percent, based on hydrocarbonaceous material to be reacted.

The process of the invention has several important advantages. In the first place, the sulfur to phosphorus ratio as measured by the phosphorus and sulfur contents of the final product is higher for a given ratio of reactants than that obtainable in thermal phosphosulfurization.

The radiochemically produced phosphosulfurized materials have a better color than those thermally produced, for comparable sulfur and phosphorus contents. At the same time, the corrosiveness of the products of the invention toward such metals as copper and silver is lower than that of conventional materials. The reaction is carried out at relatively low temperatures involving little, if any, heat decomposition of the hydrocarbons charged. Since most hydrocarbons are relatively stable toward the amount of radiation here involved, a more uniform and better defined product is obtained in accordance with the invention. In addition, a less viscous product may be produced in a fully continuous process.

Hydrocarbon materials useful for the purposes of the present invention should, in most cases, have a relatively high reactivity toward phosphorus sulfides, or should be readily polymerizable in the presence of phosphorus sulfides and ionizing radiation to give the hydrocarbon-phosphorus sulfide copolymers. Such materials include the paraffins, olefins, diolefins, acetylenes, aromatics, cyclic aliphatics and mixtures thereof. Examples of such mixtures are various virgin or cracked petroleum fractions, coal hydrogenation products, Fischer synthesis products, etc. For the production of most lubricating oil additives, hydrocarbons having molecular weights above about 100 are preferred, lubricating grade oil distillates and residues, such as bright stock, being particularly suitable.

Specific hydrocarbons include petrolatums and waxes, isobutylene, decene, dodecene, olefinic extracts of gasolines or gasoline itself, cracked cycle stocks, olefinic polymers, such as those having molecular weights up to as high as 10,000, butadiene, cyclopentadiene, terpene and terpene derivatives, acetylene and substituted acetylenes. Aromatic hydrocarbons, such as benzene, xylenes, naphthalene, anthracene, and other alkylated and/or condensed ring aromatics may be used. Also various resin oils derived from petroleum residua are useful. It will be obvious to the skilled worker that other types of hydrocarbons not specifically mentioned may be employed effectively in accordance with the present invention.

Suitable materials containing hydrocarbon radicals include various ester monomers and polymers, such as esters of saturated or unsaturated monobasic or dibasic acids with saturated or unsaturated straight chain or branched chain aliphatic or cyclic alcohols. Examples of such esters are given in the copending Black and Holliday application, Serial No. 386,655, filed October 16, 1953, now U.S. Patent No. 2,803,598 and assigned to the same interests and U.S. Patents 2,631,130 and 2,656,318.

A specific embodiment of the invention involves the conversion of low molecular weight polymerizable hydrocarbon materials into phosphosulfurized products of relatively high molecular weight. In accordance with this embodiment of the invention, such polymerizable materials are subjected to radio-active irradiation in the presence of a suitable phosphosulfurizing agent at the conditions specified above. When so operating, polymerization and phosphosulfurization take place substantially simultaneously in a single stage procedure yielding a polymeric product containing phosphorus and sulfur incorporated as an integral part of the polymer chain. The molecular weight of these polymers may be readily controlled by controlling reaction temperature and radiation intensity, the molecular weight in most cases being the higher the lower the temperature and/or the higher the radiation intensity. Low molecular weight paraffinic and aromatic olefins, such as ethylene, propylene, styrene, etc.; branched chain olefins, such as isobutylene; diolefins, such as butadiene, piperylene, dimethallyl, isoprene, etc.; or copolymerizing mixtures of such olefins are most suitable for this purpose. Polymerizable esters of the type mentioned above may also be used. Phosphosulfurized polymers of molecular weights ranging from 300 to 10,000 may be readily prepared in this manner.

The phosphosulfurization agent used for the purposes of the present invention may be $P_2S_3$, $P_2S_5$, $P_4S_3$, $P_4S_7$ or their mixtures, or mixtures of elemental phosphorus and sulfur, or other materials. A sulfide of phosphorus, especially phosphorus pentasulfide ($P_2S_5$) or phosphorus sesquisulfide ($P_4S_3$) is preferred. Generally, in the range of about 1.0 to 50.0% by weight, based on the hydrocarbon, of phosphosulfurizing agent is used. A preferred range is about 5–20 wt. percent. Products containing above about 0.3% by weight of both sulfur and phosphorus are readily formed under these treating conditions.

As indicated above, intimate contact between the reactants is indispensable to afford reasonable rates and velocities of reaction. Such intimacy of contact is best achieved in accordance with a preferred embodiment of the invention by subjecting the reactants to radioactive irradiation in the form of a solution in a solvent for both reactants which is substantially inert to the type of radiation employed. Examples of suitable solvents include carbon disulfide, benzene, toluene, xylene, and others. Also mixtures of solvents, such as light aromatic petroleum distillates may be used for this purpose. Since phosphorus sulfides are much more soluble in carbon disulfide, this is the preferred solvent for the reaction. Solutions of this type may contain about 5–50 wt. percent of the hydrocarbon reactant and about 0.1–10.0 wt. percent of the phosphosulfurizing agent, depending on the reaction ratio desired. Intimate contact of the reactants can also be obtained in the absence of solvents by the use of a colloidal mill or similar homogenizer.

The phosphosulfurized hydrocarbon materials prepared in accordance with the invention may be used as lubricating oil additives in concentrations of about 0.1–20 wt. percent, preferably about 1–10 wt. percent, depending on the purpose of the additive and the ultimate use of the lubricant. Amounts up to about 15 wt. percent are generally sufficient for detergency, anti-corrosion purposes and extreme pressure service.

The phosphosulfurized hydrocarbon materials or the derivatives thereof may be stored and shipped as produced but are generally handled in the form of concentrates in an oil base stock containing as much as 20–50 or more weight percent of the active ingredient. The concentrate may then be used for addition in small quantities to fuels, lubricants, greases, etc.

Oil compositions containing the phosphosulfurized hydrocarbon materials of the invention may be further improved by the addition of conventional modifying agents, such as dyes, other anti-oxidants, tackiness agents, etc., or pour depressors, such as wax-naphthalene condensation products, wax-phenol condensation products as well as V.I. improvers, such as polybutenes, polyvinyl ethers, etc.

Conventional means of irradiating materials with radio-active radiation may be employed to carry out the process of the invention. For example, batches of the reaction mixtures may be inserted in, or reactant streams passed through pipes made of, or containing the radioactive material and shielded from the outside to protect the operator. Another suitable arrangement is described in the copending Black et al. application, Serial No. 368,972 filed July 20, 1953 and assigned to the same interests as the present application. In accordance with this procedure, the radioactive materials are stored in the bottom of a concrete or metal-lined pit which is filled with water to a level sufficient to absorb the radiation being emitted. The radioactive materials may be held in metal containers or under a thin layer of concrete to prevent direct contact with the water. The reactants may either be lowered in batches into the pit or passed through pipes through the pit in a position in which they are adequately exposed to the radiation emitted by the radioactive materials. The water acts as a shield protecting the operator above the pit against radiation. No radiation passes through the ground around the pit. Other suitable means for carrying out the process of the invention may appear to those skilled in the art.

The invention will be further illustrated by the following specific examples.

EXAMPLES

In conventional phosphosulfurization reactions (Runs F, G, J and L—Table I below) the hydrocarbon (polyisobutylene or bright stock) was mixed with 5–10% by weight of the phosphorus sulfide and reacted at about 420° F. for 6 hours while stirring.

325° F. After this the test strip was washed with a hydrocarbon solvent and the gain or loss in weight determined. Then the strip was washed with a potassium cyanide solution to remove silver sulfides, etc. and the weight change was again determined.

In the oxidation test on gasoline blends the oxidation induction period was determined using the ASTM D–525–49 method.

The conditions and results of these experiments are summarized in Table I below.

TABLE I
*Phosphosulfurization*

| Reaction system | $P_4S_3$—polybutene (1,100 mol. wt.)—$CS_2$ | | | | $P_4S_3$—polybutene (1,100 mol. wt.)—benzene | $P_4S_3$—polybutene (1,100 mol. wt.) | $P_4S_3$—solvent refined, acid and clay treated residuum, V/210° F. 170 SUS—$CS_2$ | $P_2S_5$—polybutene (1,100 mol. wt.)—$CS_2$ | $P_2S_5$—polybutene (1,100 mol. wt.) | $P_2S_5$—solvent refined, acid and clay treated residuum, V/210° F. 170 SUS—$CS_2$ | $P_2S_5$—solvent refined, acid and clay treated residuum, V/210° F. 170 SUS—$CS_2$ |
|---|---|---|---|---|---|---|---|---|---|---|---|
| Run | A | B | C | D | E | F | G | H | I | J | K | L |
| Reaction conditions: | | | | | | | | | | | | |
| Temperature, °F | 70 | 70 | 70 | 150 | 70 | ² 420 | 420 | 70 | 70 | 420 | 70 | 405–425 |
| Time, hours | 24 | 8 | 3 | 24 | 24 | 6 | 6 | 24 | 24 | 10 | 24 | 10 |
| Radiation dosage (R) | 6×10⁶ | 2×10⁶ | 7.5×10⁵ | 7×10⁵ | 5.6×10⁶ | None | None | 6×10⁶ | 6×10⁶ | None | 6×10⁶ | None |
| Product: | | | | | | | | | | | | |
| Yield, percent | 91 | 95 | 97 | 93 | 67 | Ca. 95 | Ca. 95 | 87 | 97 | Ca. 95 | 97 | 96 |
| Phosphorus, percent | 0.88 | 0.97 | 0.82 | 0.74 | 0.54 | 0.31 | 1.49 | 0.82 | 0.32 | 2.61 | 0.24 | 2.43 |
| Sulfur, percent | 0.84 | 0.75 | 0.66 | 0.67 | 0.49 | 0.23 | 1.14 | 0.98 | 1.50 | 4.13 | 1.62 | 4.47 |
| S/P molar ratio ³ | 0.92 | 0.75 | 0.78 | 0.88 | 0.88 | 0.72 | 0.74 | 1.16 | 4.34 | 1.53 | 6.51 | 1.78 |
| 3% blends in base oil A:⁴ | | | | | | | | | | | | |
| Vis./100° F., SUS | 582 | 584 | 583 | 583 | 574 | | | 531 | 589 | | 586 | |
| Wet sludge dispersancy (cc.) | 0.45 | 0.45 | 0.25 | 0.30 | 0.15 | 0.25 | 0.40 | 0.125 | | | | |
| 2.5% blends in base oil B:⁵ | | | | | | | | | | | | |
| Silver corrosion, weight change (mg.): | | | | | | | | | | | | |
| Before CN wash | | +1.4 | | +1.4 | | +0.2 | +2.9 | | +4.2 | | −1.7 | |
| After CN wash | | −8.9 | | −8.9 | | −6.0 | −161.6 | | −20.6 | | −44.4 | |
| 0.2% blends in heavy catalytic naphtha oxidation induction: period (min.) ⁶ (ASTM D–525–49) | | 685 | | 630 | | 550 | 800 | | | | | |

² 5% phosphorus sulfide treat. All others 10%.
³ $P_4S_3$ has S/P=0.75 and $P_2S_5$ has S/P=2.50 (analysis of $P_2S_5$ used in these experiments gave S/P=2.6).
⁴ Base oil A=518 SUS/100° F. Base oil A+3% polybutene=586 SUS/100° F. Base oil A+3% refined residuum=542 SUS/100° F.
⁵ Base oil B=about 60 SUS/210° F. and minimum V.I. of 70.
⁶ Induction period of base naphtha is 495 min.

In radiation induced phosphosulfurization reactions (Runs A, B, C, D, E, H, I, and K—Table I above) 10% by weight of the phosphorus sulfide (based on the hydrocarbon) was dissolved, along with the hydrocarbon feed, in a solvent such as carbon disulfide or benzene. This solution was exposed in a sealed container to the radiation emitted by radioactive cobalt ($Co^{60}$) at 70° F. or 150° F. for 3, 8 or 24 hours. The radioactive cobalt was used in the form of a pipe. The samples were placed in a sealed glass container enclosed in an aluminum canister which was introduced into the center of the pipe. The radioactive cobalt was contained in a lead pig absorbing harmful radiation to the extent that the operator could work within 6 ft. of the unit at all times. The samples in the pipe were exposed to a radiation intensity of about 250,000 R./hr.

After removal of any excess phosphorus sulfides the products of these experiments were then tested for their sludge dispersancy, corrosivity toward silver and oxidation inhibition as follows:

In the sludge dispersancy test, 10 grams of used oil sludge, 90 grams of the test oil and 1 gram of water were heated to 185° F., mixed thoroughly and a 7 inch column of the mixture was placed in a 100 cc. graduate and stored at 200° F. for 24 hours. Then the top 25 cc. was transferred to a 100 cc. ASTM centrifuge tube, diluted to 100 cc. with heptane and centrifuged. The volume of solids was then recorded representing the total solids originally suspended in the top 25 cc. layer of the test oil.

In the silver corrosion test a strip of polished silver was suspended in the test oil which was heated for 16 hours at The following conclusions may be drawn from the data of Table I:

(1) Varying the irradiation time from 3–24 hours or the temperature from 70°–150° F. had very little effect on the S and P content or sludge dispersing efficiency of the gamma initiated products (Runs A–D).

(2) Little depolymerization of polybutene in the radiation field took place since the viscosity of the phosphosulfurized polybutenes was unaffected and the product yield was high in every case. Reaction with phosphorus sulfides probably does not result from the fragments of polymer breakdown but from radicals derived from the phosphorus sulfide. The gamma ray induced reaction of $P_2S_5$ with the refined residuum supports this conclusion since the refined residuum is quite stable under the conditions of these experiments.

(3) The higher S/P ratios in the gamma irradiated products cannot be due to incorporation of $CS_2$ in the product, since a high ratio (0.88) was also obtained with a benzene solvent (0.75 for $P_4S_3$—Run E).

The data contained in Table I also show that gamma radiation produces a different product than that derived from heat treatment. The products prepared using gamma irradiation differ from those produced by conventional methods in the phosphorus and sulfur contents and ratio. In addition, it has been found that upon heat treatment for 6 hours at 420° F. some gamma irradiated materials, particularly the $P_4S_3$-treated materials yield a product different from the product obtained by similar heat treatment in the preparation of the conventional products.

The effect of heat treatment on gamma irradiated materials is illustrated in Table II below.

TABLE II
*Heat treatment of phosphosulfurized products prepared under gamma radiation*
[Heated 6 hours at 420° F. under nitrogen]

| Inspections | Product from Run A of Table I | | Product from Run K of Table I | |
|---|---|---|---|---|
| | As prepared | After heating | As prepared | After heating |
| Run No. | I | II | III | IV |
| Recovery, percent | | 95 | | 91 |
| Percent sulfur | 0.84 | 0.07, 0.08 | 1.62 | 0.62 |
| Percent phosphorus | 0.88 | 0.96, 0.93 | 0.24 | 0.042, 0.034 |
| S/P | 0.92 | 0.07 | 6.51 | 14.3 |
| Wet sludge dispersancy (cc.) [1] | 0.45 | 0.70 | 0.05 | 0.025 |
| Oxidation induction period (min.) [2] | 630–685 | 585 | | |

[1] 3% in base oil A.
[2] 0.2% in heavy catalytic naphtha (base naphtha equals 495 min. breakdown time).

The data of Table II show that heat treatment of a $P_4S_3$-treated polybutene made in accordance with the invention gave a "phosphorized" product with little sulfur but improved sludge dispersancy. This product is also an oxidation inhibitor in gasolines (Run II). The conventional $P_4S_3$-treated polybutene of Run G (Table I), on the other hand, had a considerable sulfur content (0.74 S/P ratio vs. 0.07 for the heat treated gamma-irradiated product). Contrasted to this, heat treatment of the gamma-irradiated $P_2S_5$-treated refined residuum (Run IV) gave a material in which almost all the phosphorus was lost (14.3 S/P ratio vs. 1.78 for the conventional thermal product of Run L of Table I). These data show that the invention may be used to produce by phosphosulfurization, products containing almost exclusively sulfur or products containing almost exclusively phosphorus as the modifying element.

While the color, corrosivity and odor stability of the products of the invention are satisfactory, it may be desirable to form an inorganic or organic derivative thereof whereby the product is further stabilized and improved. This may be done by reacting the product with a modifying agent, such that its odor and stability is still further improved. Modifying agents include bases or basic reacting materials, reactive olefinic hydrocarbons, ethers, unsaturated esters, etc. For example, the phosphosulfurized hydrocarbon may have a portion or all of its titratable acidity neutralized by treatment with a hydroxide, carbonate, or oxide of alkali and alkaline earth metals, such compounds including potassium or sodium hydroxide, barium hydroxide, lime, etc. Such products are quite useful where it is desired to incorporate a metal constituent in the finished material for detergency purposes. Other basic reagents, such as ammonia, alkyl or aryl substituted amines, guanidine, and the like, may be used.

A preferred class of basic reagents comprise guanidine cation-containing compounds, such as guanidine and its derivatives. These include guanidine carbonate, methyl guanidine, decyl-guanidine, tribenzyl-guanidine, and the like. The guanidine derivatives of phosphosulfurized hydrocarbons are desirable ashless detergents for aviation lubricants and the like since they contain no metal constituent. The use of guanidine derivatives for this purpose is disclosed and claimed in U.S. Patent Nos. 2,613,205 and 2,644,792.

The product may also be treated with a reactive olefinic material, such as isobutylene, di-isobutylene, cyclopentene, terpenes including dipentene, alpha pinene, terpinolene, and other hydrocarbons containing at least one olefinic double bond. The use of reactive olefins for this purpose is disclosed and claimed in U.S. Patent No. 2,640,053.

The above-mentioned modifying reactions may be carried out at temperatures in the range of from about 60° up to about 400° F. for times such as about 0.5–10 hours, the amounts of materials being used depending on factors, such as the extent to which the titratable acidity is to be reduced or to which the stability of the product is to be improved. Amounts of reagents may, for example, vary in the range of about 0.5–50% by weight, preferably 1–30% by weight, based on the phosphosulfurized hydrocarbon.

The products of the present invention may be employed as additives in motor fuels, hydraulic fluids, cutting oils, turbine oils, fuel oils, transformer oils, and the like, as well as in lubricants and greases, as anti-oxidants, sludge dispersers, etc. They may be used in conventional mineral oil lubricants and synthetic lubricants of the poly-ester or poly-ether types or in other synthetics, such as carbonates, acetals, formals, etc. as well as admixtures of these.

The invention is not limited to the specific figures of the foregoing examples. The relative proportions of the reactants and mixture components as well as the reaction conditions may be varied within the limits indicated in the specification to obtain products of varying characteristics.

What is claimed is:
1. The method of producing phosphosulfurized hydrocarbonaceous materials which comprises exposing a hydrocarbonaceous material selected from the group consisting of hydrocarbons and esters containing hydrocarbon radicals in intimate contact with a phosphosulfurizing agent at a temperature in the range of 60° to 200° F. to a total dosage of high energy ionizing radiation in the range of $5 \times 10^3$ to $9.6 \times 10^8$ Roentgens.
2. A phosphosulfurized hydrocarbonaceous material produced by the method of claim 1.
3. A lubricating oil composition comprising a major proportion of a lubricating oil and a minor proportion of the phosphosulfurized material of claim 2.
4. The method of claim 1 in which said agent is selected from the group consisting of phosphorus sulfides and mixtures of elemental sulfur and phosphorus.
5. The method of claim 1 which is carried out in the presence of a solvent for both said material and said agent, said solvent being substantially inert to said radiation.
6. The method of claim 1 in which said material is polymerizable and polymerization thereof takes place under the influence of said radiation.
7. The method of producing phosphosulfurized hydrocarbons which comprises exposing a hydrocarbon in intimate contact with about 5–25% of its weight of a phosphorus sulfide to a total dosage of gamma radiation in the range of $5 \times 10^3$ to $9.6 \times 10^8$ Roentgens at a temperature of about 60°–200° F. until said hydrocarbon is phosphosulfurized to contain about 0.2–10 wt. percent of phosphorus and about 0.2–15 wt. percent of sulfur.
8. The method of claim 7 in which said phosphosulfurized hydrocarbon is subjected to a heat treatment at a temperature substantially above 200° F. for a time of several hours, sufficient appreciably to change its sulfur:phosphorus ratio.
9. The method of claim 7 in which said phosphosulfurized product is treated with about 0.5–50 wt. percent of a reagent selected from the group consisting of basic materials and unsaturated organic compounds.
10. The method of claim 8 in which said phosphorus sulfide is $P_4S_3$, said heat treatment being carried out at about 420° F. for about 6 hours.
11. A lubricating oil composition comprising a major proportion of a mineral lubricating oil and about 0.1–20 wt. percent of a phosphosulfurized hydrocarbon prepared by a method comprising exposing a hydrocarbon in intimate contact with about 5–25% of its weight of a phosphorus sulfide to a total dosage of gamma radiation in the range of $5 \times 10^3$ to $9.6 \times 10^8$ Roentgens at a tempera- ture of about 60°–200° F. until said hydrocarbon is phosphosulfurized to contain about 0.2–10 wt. percent of phosphorus and about 0.2–15 wt. percent of sulfur.

12. A lubricating oil composition according to claim 11 in which said phosphosulfurized hydrocarbon is prepared in the presence of carbon disulfide as a solvent, said hydrocarbon being selected from the group consisting of polybutene and refined mineral oil residuum, said temperature being about 70° F., said total dosage being about $10 \times 10^6$ Roentgen.

13. A method of producing a phosphosulfurized hydrocarbon which comprises exposing a hydrocarbon selected from the group consisting of polybutene and refined mineral oil residuum, in intimate contact with about 5% to 25% by weight, based on the hydrocarbon, of phosphorus sulfide to gamma radiation having an intensity in the range of $10^4$ to $2 \times 10^7$ R/hr. for a time of about 0.5 to 48 hours at a temperature of about 60° to 200° F. until said hydrocarbon is phosphosulfurized to contain about 0.2 to 10 wt. percent of phosphorus and about 0.2 to 15 wt. percent of sulfur.

14. A method according to claim 13 wherein said phosphorus sulfide is selected from the group consisting of $P_4S_3$ and $P_2S_5$.

15. A method according to claim 13 wherein said exposure to gamma radiation is carried out in the presence of a solvent for the reactants selected from the group consisting of carbon disulfide and benzene.

16. A phosphosulfurized hydrocarbon product prepared in accordance with the method of claim 13.

References Cited in the file of this patent

UNITED STATES PATENTS

| 2,316,078 | Loane et al. | Apr. 6, 1943 |
| 2,353,837 | Loane et al. | July 18, 1944 |
| 2,489,091 | Khorasch | Nov. 22, 1949 |
| 2,491,992 | Malkemus | Dec. 20, 1949 |
| 2,516,848 | Brasch | Aug. 1, 1950 |
| 2,613,205 | Hill | Oct. 7, 1952 |

FOREIGN PATENTS

| 299,735 | Great Britain | Oct. 30, 1928 |
| 282,370 | Switzerland | Apr. 30, 1952 |

OTHER REFERENCES

Atomic Energy Research Establishment, "Symposium on Utilization of Radiation From Fission Products." Held at Harwell on 23rd and 24th February 1953. Edited by G. N. Walton, J. W. Wright, Ministry of Supply, Harwell, Berks, June 1953, pages 113–118.